United States Patent [19]
Huff

[11] 3,930,653
[45] Jan. 6, 1976

[54] LID LATCH MECHANISM FOR A DISC RECORD PLAYER

[75] Inventor: Larry Dean Huff, Indianapolis, Ind.
[73] Assignee: RCA Corporation, New York, N.Y.
[22] Filed: Jan. 30, 1975
[21] Appl. No.: 545,407

[52] U.S. Cl............ 274/1 R; 178/6.6 DD; 274/1 G; 274/2; 360/86
[51] Int. Cl.² .......................................... G11B 1/00
[58] Field of Search ............... 274/9 B, 2, 1 R, 1 G; 178/6.6 DD; 360/86

[56] References Cited
UNITED STATES PATENTS

| | | | |
|---|---|---|---|
| 3,716,240 | 2/1973 | Freeman ................................ | 274/2 |
| 3,842,194 | 10/1974 | Clemens ................................ | 274/38 |
| 3,886,592 | 5/1975 | Kato et al. ............................. | 274/2 |

Primary Examiner—William D. Martin, Jr.
Assistant Examiner—Steven L. Stephan
Attorney, Agent, or Firm—Eugene M. Whitacre; William H. Meagher; Dilip A. Kulkarni

[57] ABSTRACT

A lid is pivoted to the base of a record player for movement between a closed position and an open position. A leaf spring is secured to the base at one end thereof. A detent is mounted to the remote end of the leaf spring for movement between (1) a protruding condition subject to engagement with the lid when closed, and (2) a retracted condition releasing the lid if closed. A plunger is reciprocably mounted for cooperation with a lid release button. A slide is movably mounted in the base adjacent the leaf spring for movement between (a) a position interposed, and (b) a position not interposed, between the plunger one end and the leaf spring. The plunger responsive to operation of the release button moves the detent to the retracted condition, via the slide and the leaf spring, if the slide is in the interposed position. If the slide is not interposed, the release button is ineffective to actuate the detent. A linkage is provided between the cam and the signal pickup carriage of the player for moving the slide to the interposed position and not-interposed position when the carriage is, respectively, in a standby mode and a playback mode thereby preventing opening of the lid during playback.

3 Claims, 7 Drawing Figures

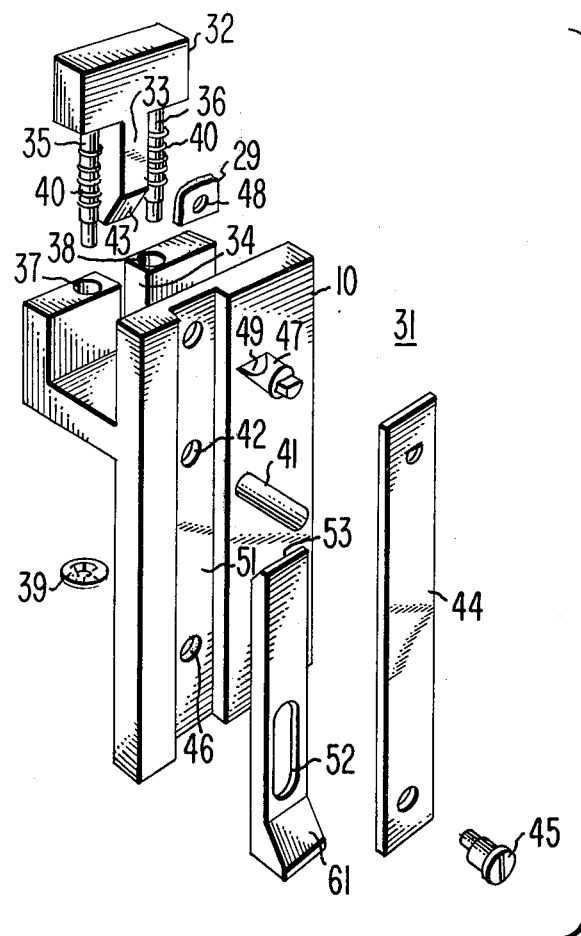
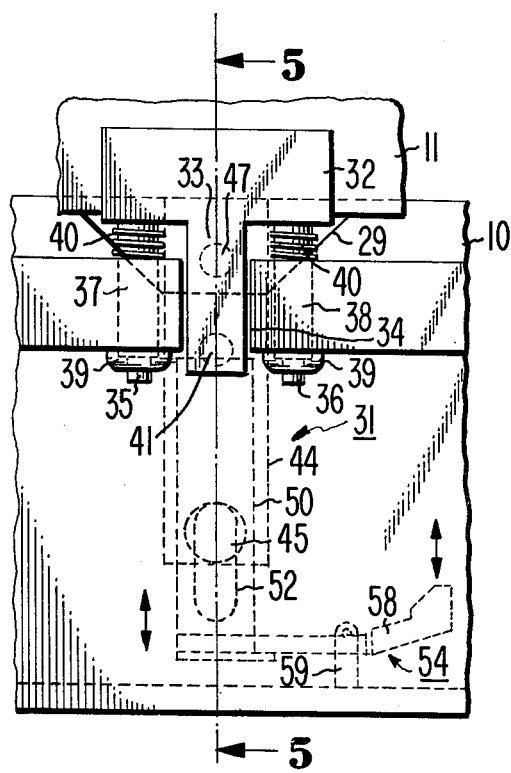
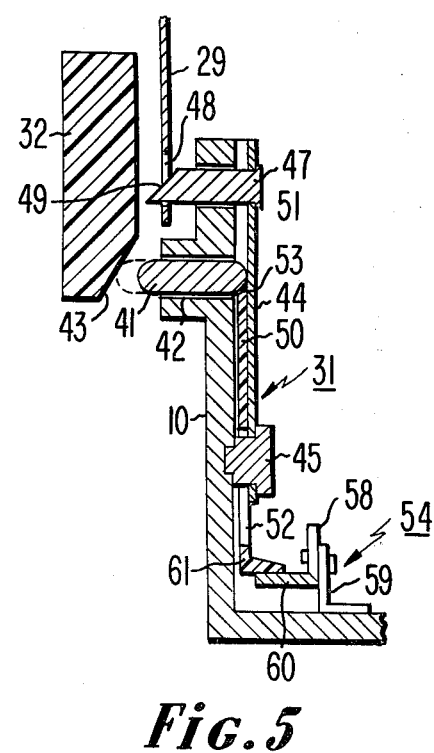
Fig.3
Fig.4
Fig.5

LID LATCH MECHANISM FOR A DISC RECORD PLAYER

The present invention relates to disc record player systems, and more particularly relates to a lid latch mechanism for preventing opening of the player lid during playback.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm, engages the spiral groove and includes a conductive electrode which establishes a capacitance with the conductive coating and the dielectric deposit of the disc record. When the disc record is rotated, the electrode-disc capacitance varies in response to the geometric variations in the bottom of the spiral groove passing beneath the signal pickup. The capacitance variations are converted to electrical signal variations by a suitable signal processing circuitry coupled to the pickup electrode. The output signal of the signal processing circuitry may be coupled to a conventional television receiver for reproduction. The pickup arm is mounted on a signal pickup carriage of the playback system. A system of the aforementioned type is described in detail in U.S. Pat. No. 3,842,194, issued on Oct. 15, 1974 to Jon K. Clemens.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the pickup arm assembly, around the pickup arm pivot support, across the entire recorded surface of the disc record. Also, in video disc systems utilizing the variable capacitor concept, it is desirable for accurate reproduction of the prerecorded signals that the signal pickup electrode maintain a substantially constant attitude in the spiral groove. Therefore, a radial feed drive mechanism is provided for traversing the signal pickup carriage in proper time relationship with the radial motion of the signal pickup tip engaged in the spiral groove so as to continuously maintain the longitudinal axis of the pickup arm substantially tangential to the spiral groove at the point of engagement when the player is in a playback mode. Reference may be made to the copending U.S. Application of F. R. Stave, Ser. No. 351,600, filed Apr. 16, 1973, and entitled "VIDEO DISC PLAYBACK APPARATUS" for an illustration of a suitable radial feed drive mechanism for providing the indicated radial motion.

Further, in the aforesaid video disc systems, adequate bandwidth for monochrome and color display is obtained by rotating the disc at a speed substantially higher (e.g., 450 rpm) than the conventional audio playback speeds (e.g., 33⅓ rpm).

Additionally, in the above-mentioned video disc systems, groove engaging and low mass requirements of a signal pickup assembly result in a pickup arm unit which is extremely fragile (e.g., signal pickup width 2 microns, signal pickup depth 5 microns, signal pickup electrode width 2 microns, and signal pickup electrode depth 0.2 microns).

In the playback systems of the aforementioned type the following considerations may be encountered. First, it is desirable to prevent opening of the lid when the signal pickup carriage is in the playback mode in order to protect the fragile signal pickup assembly of the player.

Second, it may be preferable to preclude opening of the lid until the signal pickup carriage has cleared the disc record so that the record just played may be removed for changing sides, or placing a new disc record on the turntable, without hindrance.

Third, it is advantageous to provide a lid latch arrangement which permits location of a lid release switch near the latch arrangement rather than adjacent to the rest of the control switches in order to prevent accidental actuation of an improper switch.

Fourth, it is desirable to provide a lid latch mechanism which will permit a flush fit of the mechanism in the player with a minimum of protruding parts, thereby reducing safety hazard to the player user.

SUMMARY OF THE INVENTION

A lid latch mechanism is provided in a disc record player having a lid pivoted to the player base. A leaf spring is secured to the base at its one end. A detent is mounted to the remote end of the leaf spring for movement between (1) a protruding condition subject to engagement with the lid when closed, and (2) a retracted condition releasing the lid if closed. A plunger is movably mounted in the base for cooperation with a lid release button. A slide is reciprocably mounted in the base adjacent the leaf spring for movement between (a) a position interposed, and (b) a position not interposed, between the plunger one end and the leaf spring. The plunger responsive to operation of the release button moves the detent to the retracted condition, via the slide and the leaf spring, if the slide is in the interposed position. If the slide is not interposed, the release button is ineffective to operate the detent. Means intercoupling the slide and a signal pickup carriage is effective for moving the slide (A) to the interposed position when the carriage is in a standby mode, and (B) to the not-interposed position when the carriage is in a playback mode thereby preventing the lid from opening during playback.

BRIEF DESCRIPTION OF THE DRAWINGS

Objects, features, and advantages of the present invention will be more fully understood from the following detailed description of the preferred embodiment, the appended claims, and the accompanying drawings in which:

FIG. 3 is an exploded, perspective view of a portion of the lid latch mechanism suitable for use with the player of FIGS. 1 and 2;

FIG. 4 is a front view of the lid latch mechanism of FIGS. 1, 2, and 3;

FIG. 5 is a partially cut-away, sectioned side view of the lid latch mechanism along the line X—X in FIG. 4;

DETAILED DESCRIPTION OF THE PREFERRED EMBODIMENT

Figure 1:
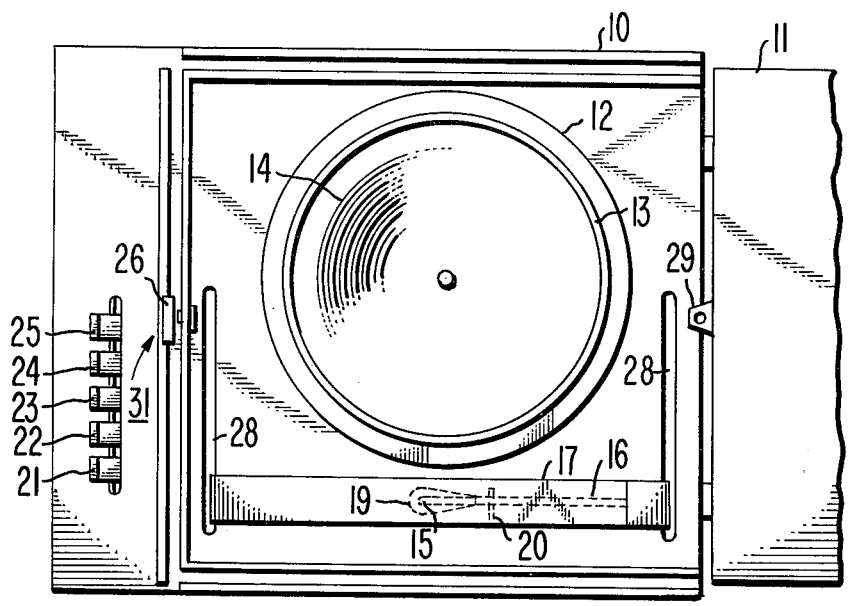
FIG. 1 is a plan view of a video disc record player incorporating an illustrative embodiment of a lid latch mechanism according to the present invention, the lid of the player is shown in an open position for clarity.
Figure 2:
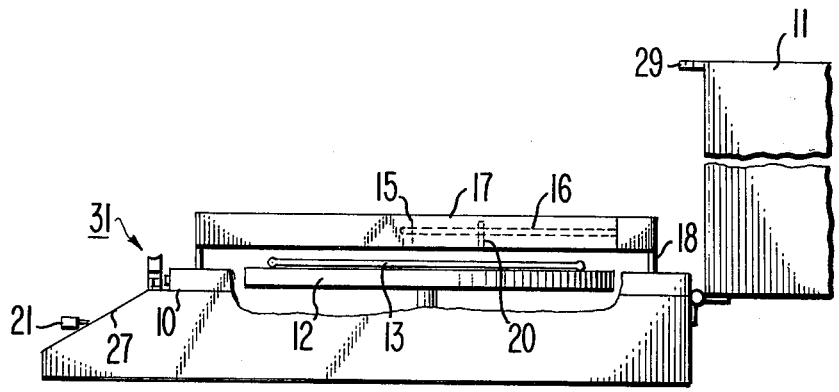
FIG. 2 is a side view of the video disc record player of FIG. 1.

Referring to the drawings, wherein like reference numerals designate similar elements in the various views, in FIGS. 1 and 2 a video disc player is shown having a base 10. A lid 11 is pivoted to the base 10 for movement between a closed position and an open position. The player is suitable for use in a video disc system such as disclosed in the aforementioned Clemens patent. A turntable 12 is rotatably mounted on the base 10. The upper surface of the turntable 12 is adapted to support a video disc record 13. Video information is recorded by means of geometrical variations in the bottom of a smooth spiral groove 14 on the substrate of the disc record 13. The disc record 13 surface includes a conductive coating which is preferably covered with a thin deposit of dielectric material. A signal pickup 15, supported at one end of a conductive pickup arm 16, engages the spiral groove 14 and includes a conductive electrode (not shown) which, together with the conductive coating and the dielectric deposit, form a capacitor. When relative motion is established between the signal pickup 15 and the disc record 13, an edge of the electrode included in the signal pickup, while riding in the spiral groove 14, serves as an electrode of a capacitor varying due to the geometric variations in the bottom of a smooth spiral groove passing beneath. The other end of the pickup arm 16 is flexibly supported by a pickup arm support carried by a signal pickup carriage 17.

As indicated before, a radial feed drive mechanism 18 traverses the pickup arm support mounted in the signal pickup carriage 17 in proper time relationship with the radial motion of the signal pickup 15 tip engaged in the spiral groove 14 so as to continuously maintain the longitudinal axis of the pickup arm substantially tangential to the spiral groove at the point of engagement. Slots 28 are provided in the base 10 for accommodating the radial motion of the carriage 17. Reference may be made to the aforementioned copending Stave application (Ser. No. 351,600) for an illustration of a suitable feed drive mechanism for providing the indicated radial motion.

During playback, the pickup arm 16 passes through an opening 19 in the bottom wall of the carriage 17 to allow the signal pickup 15 to ride in the spiral groove 14. A pivotally mounted bracket 20 lifts the free end of the pickup arm 16 to disengage the signal pickup 15 from the spiral groove 14 when the player is inoperative.

A plurality of push buttons 21, 22, 23, 24, 25, and 26 are provided along the front panel 27 for, respectively, effecting the following functions: start, pause, reject, fast forward, reverse, and lid release.

A lip 29 is fastened to the lid 11 for engagement with a detent of a lid latch mechanism 31 to be described subsequently.

Reference will now be made to FIGS. 3, 4, and 5 illustrating, respectively, an exploded view, a front view, and a partially sectioned side view of the lid latch mechanism 31.

A lid release button 32 is movably mounted in the base 10. The release button has a downwardly depending extension 33 which is seated in a slot 34 provided in the base 10. Posts 35 and 36 are secured to the release button for entry into through openings 37 and 38 disposed in the base 10. Retainers 39 are used to secure the release button 32 to the base 10. Coil springs 40 are used to bias the release button 32 into an elevated position.

A plunger 41 is movably mounted in an opening 42 provided in the base for cooperation with the release button extension 33. The extension 33 has a ramp portion 43 in order to effect plunger 41 movement when the release button 32 is depressed, as more clearly shown in FIG. 5.

A leaf spring 44 is secured to the base 10 at one end thereof by a fastener 45. A detent 47 is mounted to the remote end of the leaf spring 44 for movement between (1) a protruding condition resulting in entry thereof into an opening 48 provided in the lip 29 when the lid 11 is closed thereby captivating the lid, and (2) a retracted condition releasing the lid if closed. A ramp 49 is provided on the detent 47 so that as the lid 11 is depressed the lip 29 engages the ramp 49 to move the detent to the retracted condition whereat the leaf spring 44 is effective to insert the detent into the opening 48 thereby securely holding the lid in the closed position.

A slide 50 is reciprocably mounted in a recess 51 provided in the base 10 adjacent the leaf spring 44 for movement between (1) a position interposed, and (2) a position not interposed, between the plunger 41 one end and the leaf spring. The fastener 45 freely passes through an elongated aperture 52 in order to permit reciprocating motion of the slide 50. A ramp 53 is provided on the slide 50 in order to enable the slide to insert itself between the plunger 41 and the leaf spring 44 as the slide 50 is raised.

The plunger 41 responsive to operation of the release button 32 moves the detent 49 to the retracted condition, via the slide 50 and the leaf spring 44, if the slide is in the interposed position. If the slide 50 is not interposed, the release button 32 is ineffective to operate the detent 49.

Means 54 intercoupling the slide 50 and the signal pickup carriage 17 is provided for effecting a movement of the slide (a) to the interposed position when the carriage is in a standby mode, and (b) to the not-interposed position when the carriage is in the playback mode thereby preventing the lid from opening during playback.

Figure 6:
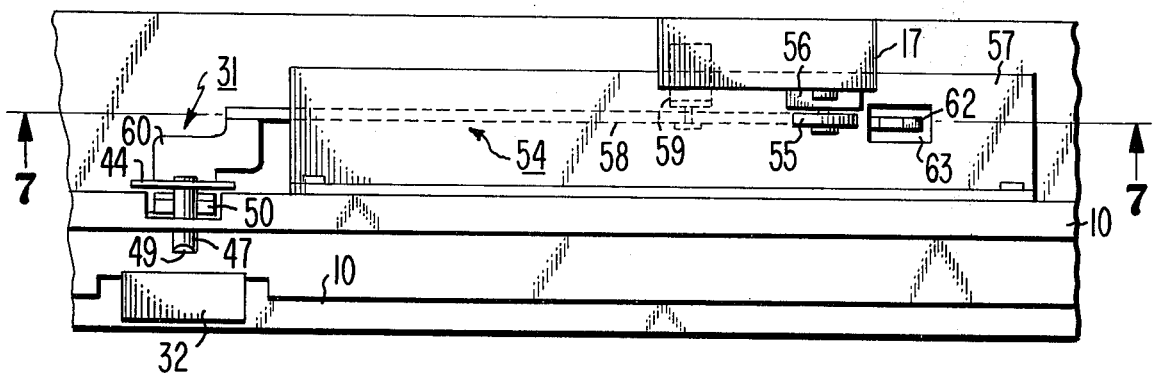
FIG. 6 is a plan view of the lid latch mechanism of FIGS. 4 and 5 illustrating means interconnecting a signal pickup carriage of the player and the lid latch mechanism.
Figure 7:
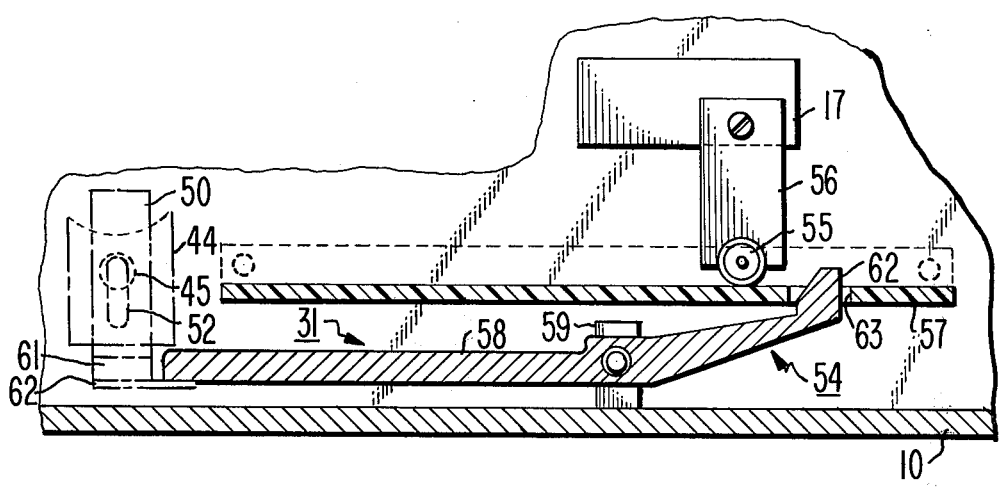
FIG. 7 is a partially sectioned front view of the lid latch mechanism along the line Y—Y of FIG. 6.

Interconnecting means 54 will now be explained with reference to FIGS. 6 and 7. A wheel 55 is secured to the front end of the carriage 17 by a bracket 56. The wheel 55 rides on a rail 57 attached to the base 10 in order to buttress the player carriage arrangement. A lever 58 is pivotally mounted to the base 10 by a bracket 59. A platform 60 of the lever 58 engages a shoe 61 provided on the slide 50. A nose portion 62 of the lever 58 protrudes through an opening 63. When the carriage 17 moves from the playback mode to the standby mode, the wheel 55 depresses the nose 62 to pivot the lever 58. As the nose 62 depresses, the platform 60 elevates the slide 50 to an interposed position thereby making the release button operative.

Thus, the lid latch mechanism, while preventing the lid opening during playback, permits the lid release button to operate the latch mechanism for releasing the lid, if closed, when the player is not in the playback mode.

What is claimed is:

1. In a playback system for recovering prerecorded signals by a signal pickup from a disc record rotatably mounted on a turntable, the playback system including a lid pivoted on a base for movement between a closed position and an open position, and a signal pickup carriage reciprocably mounted on the base for travel between a standby mode and a playback mode, a lid latch mechanism comprising:
  1. a lid release button mounted on the base;
  2. lid latch means selectively responsive to operation of the release button for releasably securing the lid, wherein the latch means comprises:
      a. a leaf spring secured to the base at one end thereof; and
      b. a detent mounted on the remote end of the leaf spring for movement between (A) a protruding condition subject to engagement with the lid when closed; and (B) a retracted condition releasing the lid if closed;
  3. a plunger reciprocably mounted in the base for cooperation with the release button;
  4. a slide movably mounted in the base adjacent the leaf spring for movement between (a) a position interposed, and (b) a position not interposed, between the plunger one end and the leaf spring; wherein the plunger, responsive to operation of the release button, moves the detent to the retracted condition, via the slide and the leaf spring, when the slide is in the interposed position; and wherein when the slide is not interposed the release button is ineffective to actuate the detent;
  5. means intercoupling the slide to the signal pickup carriage, wherein the intercoupling means are effective to move the slide to the interposed position and to the not-interposed position when the carriage is, respectively, in the standby mode and the playback mode.

2. A system as defined in claim 1 wherein a lip having an opening is attached to the lid, and wherein as the lid is depressed the lip engages a ramp portion provided on the detent to move the detent to the retracted condition whereat the leaf spring is effective to insert the detent into the opening thereby securely holding the lid in the closed position.

3. A system as defined in claim 2 wherein the intercoupling means comprises:
  an arm mounted in the base having a first end subject to engagement with the slide and a second end subject to engagement with the signal pickup carriage when the carriage is in the standby mode, wherein the engagement of the carriage with the arm second end moves the slide to the interposed position; and
  means for biasing the slide in the not-interposed position, and wherein when the carriage is in the playback mode the biasing means are effective to move the slide to the not-interposed position.

* * * * *